United States Patent
Urzainqui Larumbe

(10) Patent No.: US 7,900,977 B2
(45) Date of Patent: Mar. 8, 2011

(54) DEVICE FOR THE SEALED COUPLING OF TWO CYLINDRICAL PIPES HAVING DIFFERENT DIAMETERS

(75) Inventor: Javier Urzainqui Larumbe, Navarra (ES)

(73) Assignee: Metalurgicas Pabur, S.L., Navarra (ES)

( * ) Notice: Subject to any disclaimer, the term of this patent is extended or adjusted under 35 U.S.C. 154(b) by 66 days.

(21) Appl. No.: 12/447,633

(22) PCT Filed: Aug. 31, 2007

(86) PCT No.: PCT/ES2007/000502
§ 371 (c)(1),
(2), (4) Date: Apr. 28, 2009

(87) PCT Pub. No.: WO2008/056007
PCT Pub. Date: May 15, 2008

(65) Prior Publication Data
US 2010/0066080 A1    Mar. 18, 2010

(30) Foreign Application Priority Data
Nov. 7, 2006 (ES) ............................... 200602391 U

(51) Int. Cl.
*F16L 21/00* (2006.01)
(52) U.S. Cl. .......................... 285/419; 285/420
(58) Field of Classification Search ................. 285/419, 285/373, 420
See application file for complete search history.

(56) References Cited

U.S. PATENT DOCUMENTS

| | | | |
|---|---|---|---|
| 2,227,551 A | | 1/1941 | Morris et al. |
| 3,004,781 A | * | 10/1961 | Morris .......................... 285/420 |
| 6,758,501 B2 | * | 7/2004 | Amedure et al. ............. 285/373 |
| 6,877,780 B2 | * | 4/2005 | Potts et al. ................... 285/419 |
| 7,410,192 B2 | * | 8/2008 | Ignaczak et al. ............. 285/420 |
| 7,475,919 B2 | * | 1/2009 | Hiernard et al. ............. 285/419 |
| 2002/0014772 A1 | * | 2/2002 | Amedure et al. ............. 285/373 |
| 2004/0222633 A1 | | 11/2004 | Amedure et al. |

FOREIGN PATENT DOCUMENTS

| | | |
|---|---|---|
| ES | 1063154 | 10/2006 |
| FR | 2689204 | 10/1993 |
| WO | WO 2006109002 | 10/2006 |

* cited by examiner

*Primary Examiner* — David E Bochna
(74) *Attorney, Agent, or Firm* — Egbert Law Offices PLLC

(57) ABSTRACT

The invention relates to a device for the sealed coupling of two abutting cylindrical pipes. The device includes a truncated surrounding sleeve and clamping device to reduce the apparent diameter of the sleeve. The surrounding sleeve is cut longitudinally along the center to form a slit having two hollowed-out central wedges, which are joined to the surrounding sleeve by a neck piece. The base of the sleeve can be deformed in a controlled manner in order to connect pipes having different diameters. Two triangular housings on the opposite side, in which the triangular wedges are housed when the sleeve is clamped to the pipes.

7 Claims, 2 Drawing Sheets

DEVICE FOR THE SEALED COUPLING OF TWO CYLINDRICAL PIPES HAVING DIFFERENT DIAMETERS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a device which can ensure the sealed coupling of two abutted cylindrical pipes of similar or different diameter.

This system is mainly applicable in the automobile industry, specifically in the assembly of exhaust pipes, permitting a completely sealed coupling of two straight cylindrical tubes with the same or different diameter.

2. Description of Related Art Including Information Disclosed Under 37 CFR 1.97 and 37 CFR 1.98.

The coupling of spans of exhaust pipes could seem to have an easily resolvable solution, but this is not the case, given that the assembly is subjected to strong vibrations and must have a good seal. Coupling via welding is expensive and complicates repairs.

Numerous clamps are known which try to resolve the problem raised such as case of the clamp disclosed in ES 2 234 620, which describes an open sleeve which forms a clamping element and an inner surrounding sleeve with the ends in a pointed shape. Also, FR 2 662 486 describes a device which comprises a sleeve and an inner surrounding sleeve with beveled ends, which intends to adapt to the pipes to be joined, although these feature small differences in diameter. In spite of this, the differences in diameter of the pipes or the leverage of the pipes themselves, respectively, make a weak coupling with regard to the capacity to withstand vibrations produced by the automobile and, as a consequence, leaks are produced in both cases. There is a Utility Model of this same inventor, U200601359, which discloses a very similar system to that of the present invention consisting of a surrounding sleeve which can clamp the pipes to be joined. A central inclined slit extends into longitudinal end slits, of greater separation, so that when the edges of the central inclined slit are in contact, the edges of the longitudinal end slits remain separated. This system greatly improves the seal but has difficulties when completely absorbing the deformations or differences between the two pipes to be attached in the sealed area. Patent Publication US2004222633 discloses a clamp which features an adapter ring with two wedges which fit into its housings to prevent leaks in pipes with nominal and identical diameters. This system has the drawback of not ensuring the seal and preventing leaks when one intends to join two pipes of different diameters, as contact surface area between the wedge and its housing is lost, producing leaks.

As a consequence, an object of the present invention is to have a device for the coupling of two abutting cylindrical pipes which feature differences in diameter, resistant to vibrations and which ensures the seal without producing deformations in the sealed area.

BRIEF SUMMARY OF THE INVENTION

The device of the invention comprises a surrounding sleeve which can clamp the pipes to be joined and which has a special configuration consisting of a longitudinal slit with two central triangular wedges, in whose interior there is no material, joined to the sleeve via a neck piece on the base of the wedge and two triangular housings on the opposite side which receive the triangular wedges when the sleeve is clamped. When the coupling of the wedges takes place inside the housing thereof, the seal is produced in the contact area thereof and the neck piece of the wedge deforms to adapt to the differences in diameter of the pipes to be coupled. This special configuration of the surrounding sleeve is that which permits the complete prevention of the bulge or deformation of the contact area of the wedges with their housing.

In this way, the seal is completely ensured for small variations in the diameter of the pipes. Deformation of the sealed area is completely prevented as the difference in diameters, or deformations are fully absorbed by means of the deformation of the base of the triangle of the wedge.

BRIEF DESCRIPTION OF THE SEVERAL VIEWS OF THE DRAWINGS

To complete the preceding description and with the aim of helping towards a better understanding of the characteristics of the invention, a detailed description of a preferred embodiment is carried out, based on a set of drawings which accompanies this specification and wherein the following has been represented strictly as a guideline and in a non-restrictive manner.

In the previous figures, the numeric references correspond to the following parts and elements.

1. Circular clamp.
2. Truncated surrounding sleeve.
3. Nut.
4. Screw.
6. Longitudinal slit.
7. Wedge Housing.
8. Wedges.
9. Neck piece of the wedge.
10. Arms.
11. Longitudinal flaps.
13. Head piece.
14. Rib.
21. Protuberances.

DETAILED DESCRIPTION OF THE INVENTION

Figure 1:
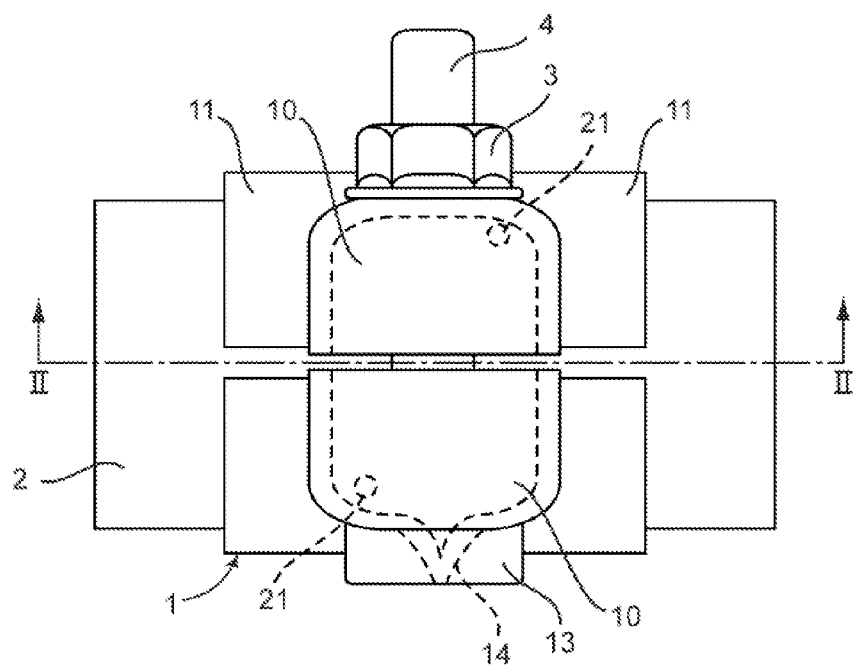
FIG. 1 shows a front elevation view of the assembly of the device of the invention, with the circular clamp coupled on the surrounding sleeve.
Figure 2:
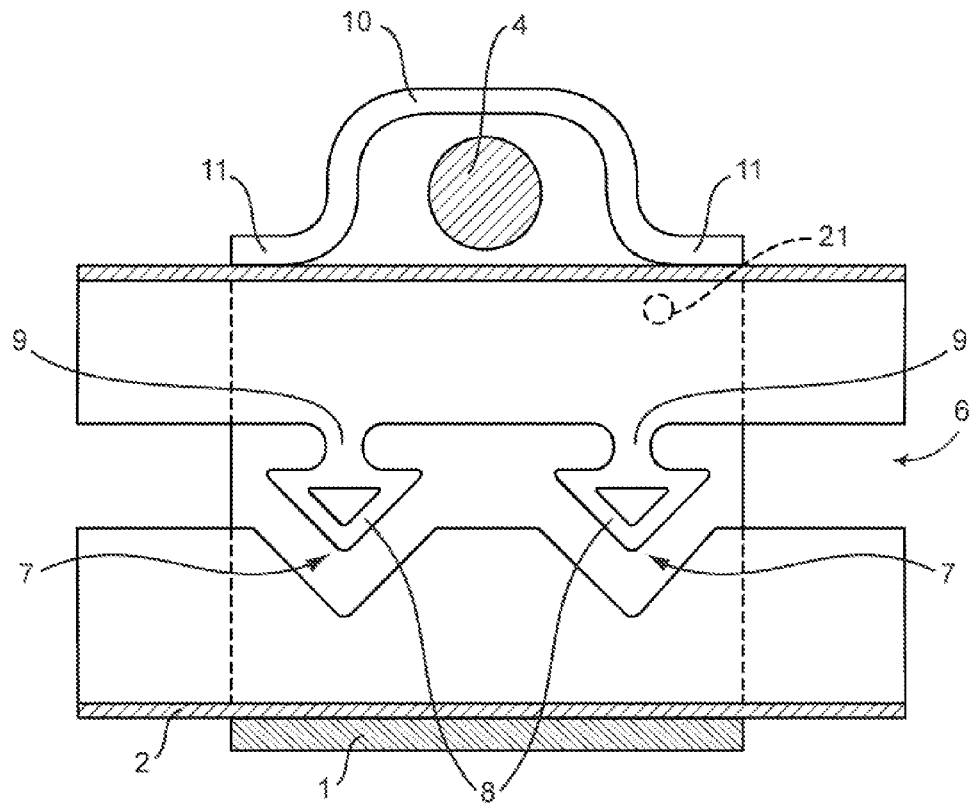
FIG. 2 shows a cross-sectional view along the line II-II of FIG. 1.

As can be observed in FIGS. 1 and 2, the device for the sealed coupling of the invention comprises a surrounding sleeve (2) which features a longitudinal slit (6) with two hollowed-out central wedges (8), each wedge joined to the surrounding sleeve by a neck piece (9), and two triangular housings (7) on the opposite side, in which the triangular wedges are housed when the sleeve is clamped to the pipes. Likewise, the sleeve features two protuberances (21) on the external part which make the assembly easier in order to ensure the correct positioning. On this surrounding sleeve (2) is applied a circular clamp (1) which features two facing U-shaped arms (10) provided with drill holes wherethrough passes a screw (4) which can receive a nut (3). One of the arms (10) features a rib (14) intended to block the screw (4) from turning, for which reason it has a level area on the head piece (13) of the screw (4). The length of the circular clamp (1) is such that it covers, at least, the housings of the two wedges of the surrounding sleeve (2).

Figure 3:
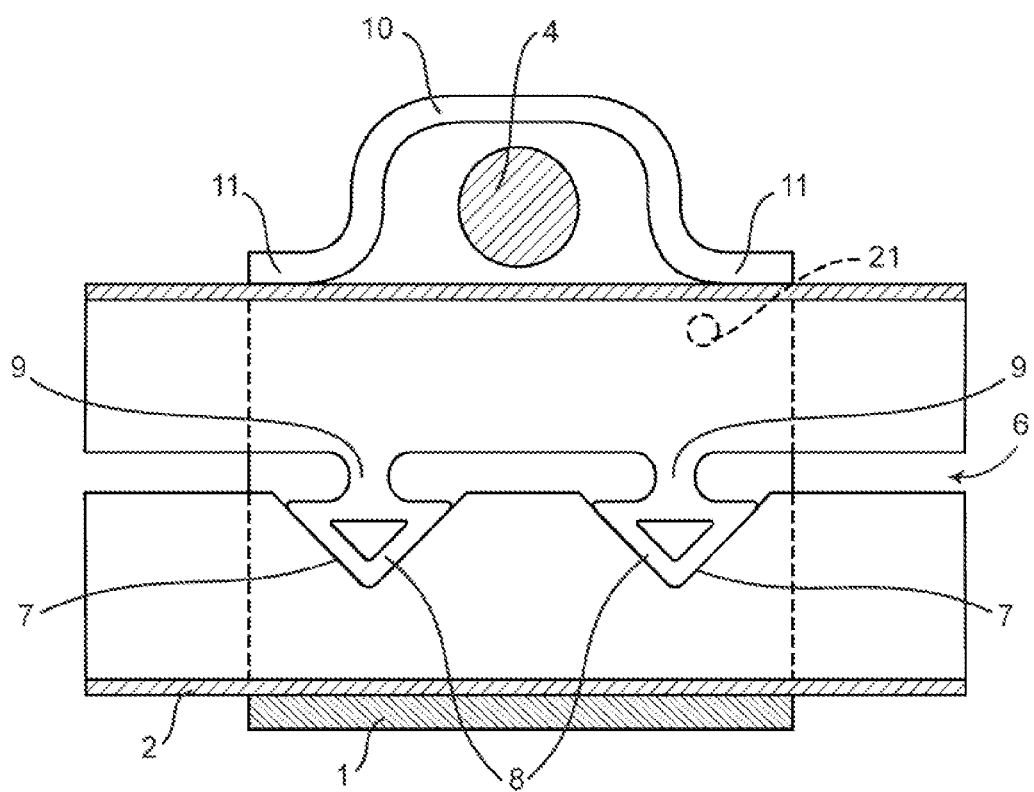
FIG. 3 shows a cross-sectional view along the line II-II of FIG. 1 after clamping.

Once the surrounding sleeve (2) has been placed on the pipes to be coupled and the circular clamp (1) is disposed in the position indicated in FIG. 1, i.e. so that the protuberances (21) remain in the diagonal of the rectangle configured by the arms (10), the nut (3) is tightened, which advantageously will be self-locking, which will reduce the apparent diameter of the surrounding sleeve (2) until the wedges (8) fit into their housings (7), when the clamping of the surrounding sleeve (2) on the cylindrical pipes to be coupled should also occur. The possible differences in diameter between the tubes shall be made up for by the controlled deformation of the bases of the wedges (9), the contact area, which is the area which will ensure the seal, between the wedge and its housing remaining unchangeable. See FIG. 3.

The surrounding sleeve (2) features a considerably longer length than the circular clamp (1) in order to improve the stability of the clamping against vibrations caused by the automobile.

Certain modifications and variants to adapt the design to the specific conditions of use and to the means of production available, respecting the essential nature of the invention, will be evident to a person skilled in the art.

I claim:

1. Device for sealed coupling of two abutting cylindrical pipes, the device comprising:
    a truncated surrounding sleeve, being cut longitudinally along a center thereof to form a slit, said slit having two hollowed-out central wedges, the wedges being joined by neck pieces, the sleeve having a deformable base to connect pipes having different diameters in a controlled manner, said slit having two triangular housings opposite the wedges, the wedges being housed in the housings when sleeve is clamped; and
    clamping means to reduce the apparent diameter of the sleeve.

2. Device for the sealed coupling of two cylindrical pipes, according to claim 1, wherein said clamping means comprises a circular clamp provided with facing arms, passed through by a screw and a nut received by said screw.

3. Device for the sealed coupling of two cylindrical pipes, according to claim 2, wherein the arms of the circular clamp feature a U-shaped cross-section.

4. Device for the sealed coupling of two abutting cylindrical pipes, according to claim 2, wherein said screw has a head piece provided with a level area which abuts a rib disposed on one of the arms of the circular clamp such that a turning of the screw is prevented.

5. Device for the sealed coupling of two cylindrical pipes, according to claim 2, wherein said nut is a self-locking nut.

6. Device for the sealed coupling of two cylindrical pipes, according to claim 2, wherein the surrounding sleeve has two protuberances disposed on ends of a diagonal of a rectangle defined by the arms of the circular clamp, ensuring a specific position of the surrounding sleeve with respect to the circular clamp.

7. Device for the sealed coupling of two cylindrical pipes, according to claim 2, wherein said circular clamp has longitudinal flaps extended over the surrounding sleeve such that at least the area corresponding to the housing of the two wedges is covered.

* * * * *